United States Patent
Kim et al.

(10) Patent No.: US 8,051,704 B2
(45) Date of Patent: Nov. 8, 2011

(54) METHOD FOR DIAGNOSING FUEL INJECTORS

(75) Inventors: Yong-Wha Kim, Ann Arbor, MI (US); Michiel J. Van Nieuwstadt, Ann Arbor, MI (US); In Kwang Yoo, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/950,668

(22) Filed: Nov. 19, 2010

(65) Prior Publication Data

US 2011/0185798 A1 Aug. 4, 2011

(51) Int. Cl.
*G01M 15/04* (2006.01)
(52) U.S. Cl. .................... 73/114.49; 73/114.15
(58) Field of Classification Search ............ 73/114.13, 73/114.15, 114.38, 114.42, 114.45, 114.48, 73/114.49
See application file for complete search history.

(56) References Cited

U.S. PATENT DOCUMENTS

| | | | |
|---|---|---|---|
| 5,099,814 A * | 3/1992 | Ament .......................... | 123/450 |
| 6,209,520 B1 * | 4/2001 | Kolmanovsky et al. ....... | 123/435 |
| 6,993,427 B2 | 1/2006 | Ueda | |
| 7,025,043 B2 * | 4/2006 | Tonetti et al. ................. | 123/436 |
| 7,317,983 B2 | 1/2008 | Ishizuka et al. | |
| 7,395,148 B2 | 7/2008 | Haraguchi et al. | |
| 7,480,557 B2 * | 1/2009 | Yamaguchi et al. .......... | 701/104 |
| 7,823,563 B2 * | 11/2010 | Jankovic et al. ............... | 123/436 |
| 7,921,707 B2 * | 4/2011 | Ishizuka et al. ............. | 73/114.74 |
| 2008/0053400 A1 * | 3/2008 | Haraguchi et al. ............ | 123/305 |
| 2008/0120013 A1 * | 5/2008 | Yamaguchi et al. .......... | 701/103 |
| 2009/0064967 A1 | 3/2009 | Shikawa et al. | |
| 2009/0281713 A1 * | 11/2009 | Jankovic et al. .............. | 701/111 |

* cited by examiner

*Primary Examiner* — Eric S McCall
(74) *Attorney, Agent, or Firm* — Julia Voutyras; Alleman Hall McCoy Russell & Tuttle LLP

(57) ABSTRACT

A fuel injector diagnostic is disclosed. In one example, the diagnostic can determine if that amount of fuel injected or the timing of start of injection is degraded. Thus, the fuel injector diagnostic method can distinguish between different types of injector degradation.

20 Claims, 5 Drawing Sheets

METHOD FOR DIAGNOSING FUEL INJECTORS

BACKGROUND/SUMMARY

Engine controllers and engine control strategies operate fuel injectors to deliver precise amounts of fuel at precise times relative to engine crankshaft angle to improve engine efficiency and reduce engine emissions. Further, when precise amounts of fuel are injected at a precise engine crankshaft angle, an expected amount of torque may be produced at the engine crankshaft via the engine cylinder. However, if a fuel injector or other component of a fuel injection system degrades, it is possible for engine torque and emissions to degrade during engine operation. For example, a change of injector response time may degrade fuel injection timing and amount of fuel injected so that engine torque varies and engine emissions degrade.

In U.S. Pat. No. 7,317,983 the inventors describe a method for balancing cylinder torque in response to engine speed. In particular, the method appears to adjust an amount of fuel injected to a cylinder based on engine speed that is related to a particular fuel injection and combustion event. However, the method appears to correct for torque imbalance without diagnosing injector operation. For example, the method appears to adjust an amount of fuel injected to a cylinder to correct a torque imbalance, but the method does not appear to determine whether or not the fuel injector is operating within expected performance criteria. Nor does the method appear to diagnose whether fuel injection errors are related specifically to variation of injected fuel amount or variation of start or end of fuel injection.

The inventors herein have recognized the above-mentioned shortcomings and have developed a method for diagnosing fuel injection, comprising: adjusting an amount of fuel injected to a cylinder to balance a torque produced via the cylinder with a torque produced via a different cylinder; sweeping fuel injection timing of the cylinder during the adjusting of the fuel injection amount; and indicating degradation of fuel injection when a minimum amount of fuel injected to the cylinder to balance the torque produced via the cylinder is outside a range.

By adjusting fuel amount and fuel injection timing it may be possible to determine whether a fuel injector is injecting fuel in an expected amount during an expected time period. For example, sweeping injected fuel amount and fuel injection timing can provide data for determining where a minimum amount of fuel injected balances cylinder torque. The amount of the minimum amount of fuel to balance cylinder torque and the timing where the minimum amount of fuel that balances cylinder torque occurs can be compared to timing and amount of a previously determined minimum fuel injected to balance cylinder torque. If the presently determined minimum amount of fuel to balance torque of an engine cylinder is outside of a range, injector degradation may be indicated. In this way, cylinder torque balancing and the minimum amount of fuel injected to balance torque of a cylinder can be used to diagnose operation of a fuel injector.

The present description may provide several advantages. For example, the approach may provide specific information regarding fuel injector degradation. For example, the approach can isolate whether injector degradation is related to an amount of fuel injected or to a timing of start or end of fuel injection. Further, the approach may be applied without additional diagnostic hardware. Further still, the approach may be applied at conditions where the engine operates during the normal course of operation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
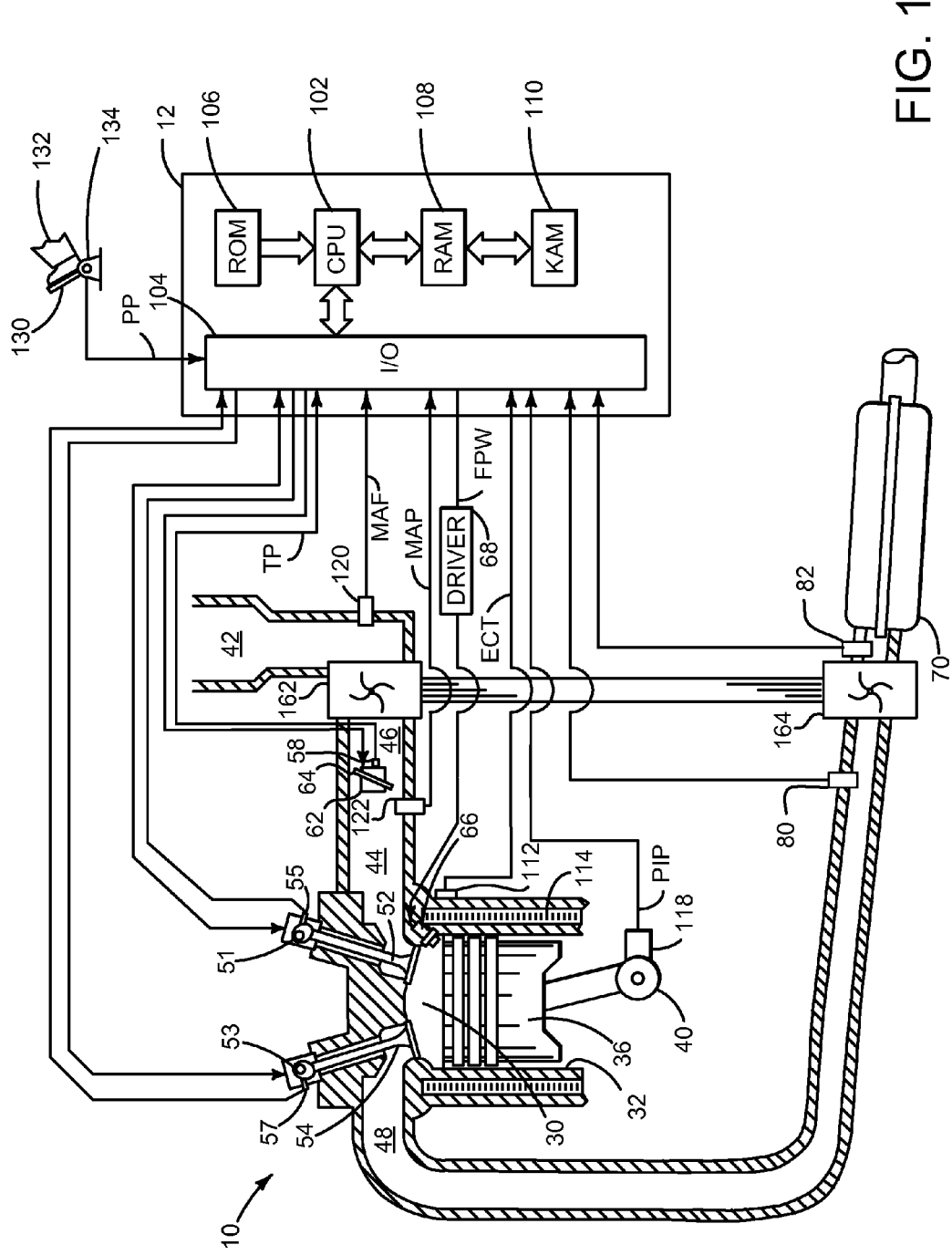
FIG. 1 shows a schematic depiction of an engine.
Figure 2:
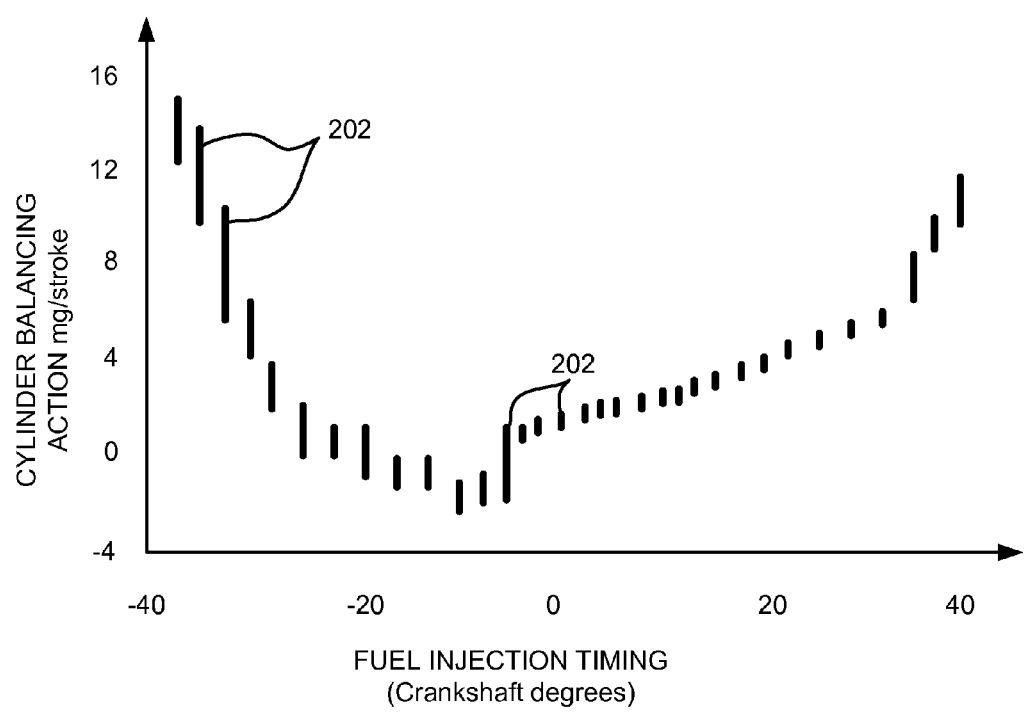
FIGS. 2-4 show example prophetic relationships between injected fuel amount, fuel injection timing, and cylinder torque balancing.
Figure 3:
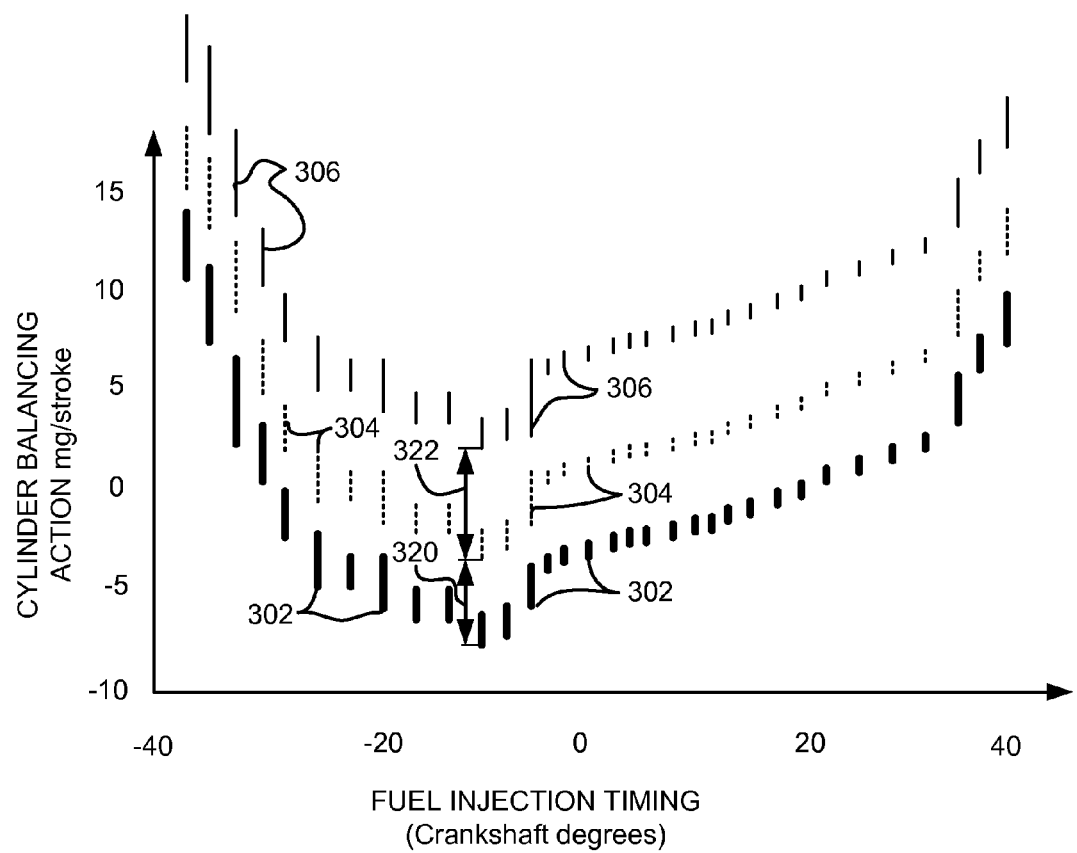
Figure 4:
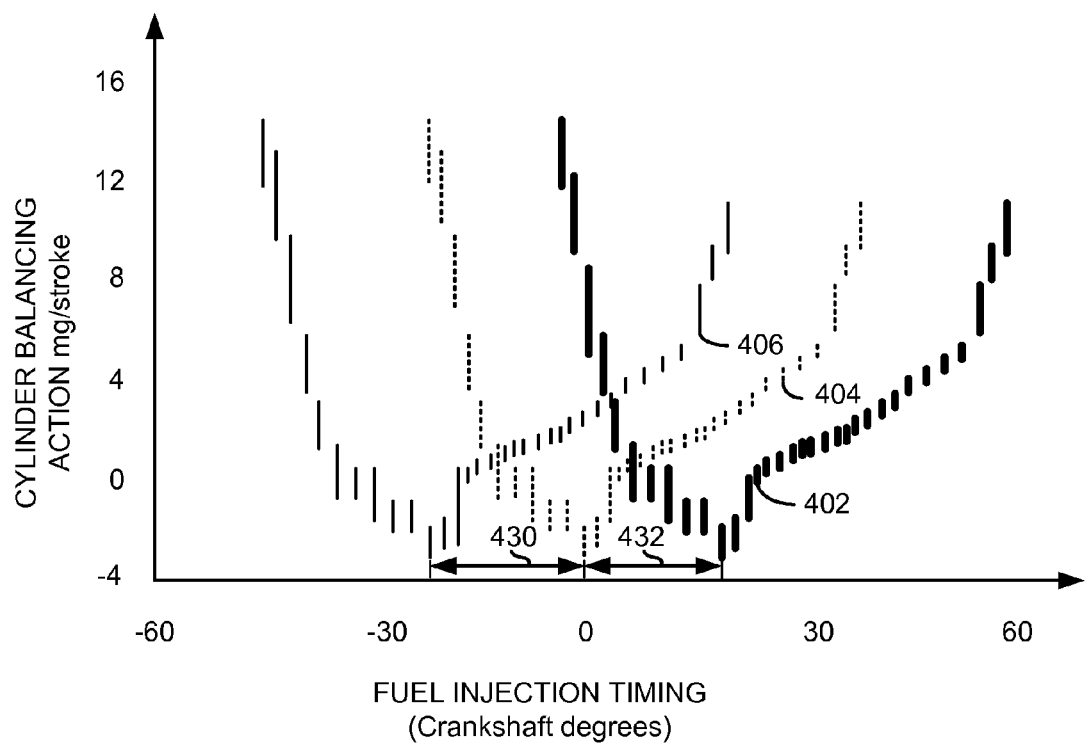

The present description is related to controlling fuel injection of an engine. FIG. 1 shows one example of a boosted direct injection engine where the method of FIG. 5 adjusts fuel injection timing and fuel injection amount to diagnose fuel injector operation. FIGS. 2-4 show relationships between minimum amount of fuel injected, fuel injection timing, and cylinder torque balance.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, fuel rail (not shown). Fuel pressure delivered by the fuel system may be adjusted by varying a position valve regulating flow to a fuel pump (not shown). In addition, a metering valve may be located in or near the fuel rail for closed loop fuel control. Fuel injector 66 is supplied operating current from driver 68 which response to controller 12.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is mechanically coupled to compressor 162.

Combustion is initiated in combustion chamber 30 when fuel automatically ignites as piston approaches top-dead-center compression stroke. In some examples, a universal Exhaust Gas Oxygen (UEGO) sensor (not shown) may be coupled to exhaust manifold 48 upstream of emissions device

70. In other examples, the UEGO sensor may be located downstream of one or more exhaust after treatment devices. Further, in some examples, the UEGO sensor may be replaced by a NOx sensor.

Emissions device 70 can include a particulate filter and catalyst bricks, in one example. In another example, multiple emission control devices, each with multiple bricks, can be used. Emissions device 70 can include an oxidation catalyst in one example. In other examples, the emissions device may include a lean NOx trap or a SCR.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a pressure sensor 80 for sensing exhaust pressure upstream of turbine 164; a pressure sensor 82 for sensing exhaust pressure downstream of turbine 164; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by compression ignition or by known ignition means such as spark plug (not shown), resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Thus, the system of FIG. 1 provides for a system for diagnosing operation of a fuel injector, comprising: an engine; a fuel injector in fluid communication with a cylinder of the engine; and a controller, the controller including instructions for adjusting an amount of fuel injected to a cylinder to balance a torque produced via the cylinder, the controller including further instructions to sweep fuel injection timing of the cylinder during the adjusting of the fuel injection amount, the controller including further instructions for indicating conditions of degradation of start or end of fuel injection timing and for indicating conditions of degradation of an amount of fuel injected to the cylinder in response to a minimum amount of fuel injected to the cylinder to balance the torque produced via the cylinder being outside a range. The system includes where the fuel injector is a direct injector, and where the engine is a diesel engine. The system includes where the controller includes further instructions to balance a torque produced by each cylinder of a plurality of cylinders of the engine. The system includes where the controller includes instructions for adjusting fuel injection amount or start of fuel injection timing beyond limits of fuel injection amount and start of fuel injection timing when the torque of the cylinder is not experiencing torque balancing.

In some engines (e.g., diesel engines) the amount of torque produced by a cylinder via the engine crankshaft can be related to the timing of fuel injection and to the amount of fuel injected. For example, if an amount of fuel is injected to a cylinder beginning at 140 crankshaft degrees before top-dead-center compression stroke of the cylinder, and timing of fuel injection is held constant, the torque produced via the cylinder can be adjusted, at least to some extent, by adjusting the amount of fuel injected to the cylinder. Adding fuel can increase the amount of chemical energy in the cylinder while subtracting fuel from the cylinder can reduce the amount of chemical energy in the cylinder. On the other hand, fuel injection timing of compression ignition engines can affect ignition timing, thereby affecting an amount of torque produced by a cylinder, at least during some conditions. In particular, the timing of fuel injection can affect the production of torque by changing the timing of heat release in the cylinder. In addition, the timing of heat release in the cylinder can affect engine emissions because timing of heat release can affect engine emissions such as NOx. Accordingly, it can be desirable to be able to determine if an amount of fuel injected and/or a timing of fuel injection is affecting cylinder operation.

Figure 5:
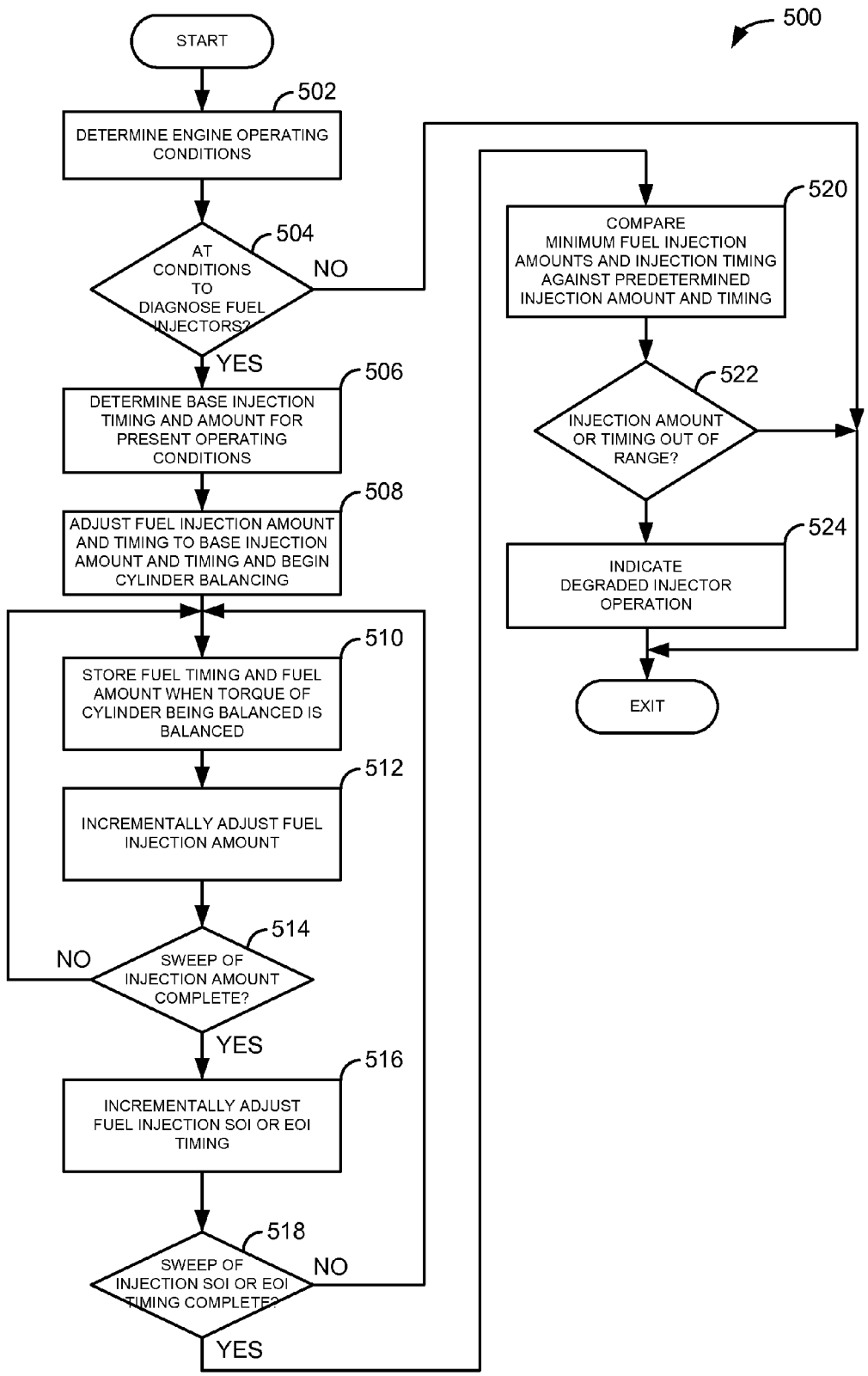
FIG. 5 shows a flowchart of an example method for diagnosing fuel injector operation.

FIGS. 2-4 provide a visual representation of the attributes of fuel injection that the method of FIG. 5 uses to determine whether or not fuel injection timing relative to crankshaft position or fuel injection amount is affecting cylinder torque and cylinder torque balancing. In particular, FIGS. 2-4 show relationships between amounts of fuel injected, fuel injection timing relative to engine crankshaft position, and cylinder torque balancing.

Referring now to FIG. 2, a prophetic plot of cylinder torque balancing fuel amount adjustment with respect to fuel injection timing is shown. The Y axis represents a fuel amount correction used to bring the torque produced via a cylinder into balance with torque produced by other cylinders. Alternatively, the Y axis can represent a fuel amount correction used to bring the torque produced via a cylinder into balance with an expected amount of torque produced by the cylinder during base operating conditions (e.g., fuel injection timing and fuel amount that produces engine torque that accelerates the engine in a known manner). For example, zero on the Y axis corresponds to commanding a base fuel amount for the selected engine operating conditions while a value of 4 indicates a base amount of fuel plus 4 mg/stroke additional fuel.

The X axis represents a start of fuel injection timing location relative to an engine crankshaft location. In alternate examples, the X axis may be shown as end of fuel injection timing relative to an engine crankshaft location. In the present example, zero refers to a base start of fuel injection timing for selected engine operating conditions. For example, for an idle speed of 700 RPM, the base start of fuel injection timing may be 160 crankshaft degrees before top-dead-center compression stroke. Therefore, according to the plot of FIG. 2, a value of zero corresponds to 160 crankshaft degrees before top-dead-center compression stroke while −20 refers to 140 crankshaft degrees before top-dead-center compression stroke, and 20 refers to 180 crankshaft degrees before top-dead-center compression stroke. In other examples, zero may correspond to a location of top-dead-center compression stroke. However, the relationship between fuel amount and fuel injection timing is maintained. Thus, the units and/or numerical values shown in FIG. 2 can be changed without departing from the scope or intent of the disclosure.

Each vertical bar 202 corresponds to an amount of fuel adjustment to the base fuel amount and a fuel injection timing adjustment that balances the torque provided by the cylinder in which the fuel is injected for a fuel injector that is injecting a proper or desired amount of fuel. Thus, it can be seen from FIG. 2 that the minimum amount of fuel to balance the torque of the cylinder is at −10 degrees relative to base fuel injection timing. Further, the minimum amount of fuel to balance the cylinder is the base fuel amount minus about 2 mg/stroke. It can be seen from FIG. 2 that the amount of fuel injected to the cylinder to balance cylinder torque increases for each fuel injection timing in advance or retarded from −10 crankshaft degrees. Further, it can be seen that the amount of fuel that is injected to balance torque of the cylinder increases at a more rapid rate when fuel injection timing is retarded rather than when advanced from the −10 degree position. Thus, from a fuel economy perspective, it is most desirable to retard the fuel injection timing by 10 degrees to increase fuel economy. However, as mentioned above, fuel injection timing may affect engine emissions so it may be desirable to set fuel injection timing to a crankshaft angle other than −10 for driving conditions.

Referring now to FIG. 3, a prophetic plot of cylinder torque balancing fuel amount adjustment with respect to fuel injection timing for three different fuel injection conditions is shown. The X and Y axis are the same as shown in FIG. 2. Therefore, the description of the X and Y axis is omitted for the sake of brevity.

Each narrow vertical bar 306 corresponds to an amount of fuel adjustment to a base fuel amount and a fuel injection timing adjustment that balances the torque provided by the cylinder in which the fuel is injected for an injector that is injecting less fuel than is desired. All vertical bars 306 represent a sweep of injected fuel amount and fuel injection timing to achieve balanced torque from the cylinder. For example, the injected fuel amount and start of injection timing are independently varied to produce the data shown. Likewise, each dashed vertical bar 304 corresponds to an amount of fuel adjustment to the base fuel amount and a fuel injection timing adjustment that balances the torque provided by the cylinder in which the fuel is injected for an injector that is injecting a desired or proper amount of fuel. All vertical bars 304 represent a sweep of injected fuel amount and fuel injection timing to achieve balanced torque from the cylinder. Similarly, each wide vertical bar 302 corresponds to an amount of fuel adjustment to the base fuel amount and a fuel injection timing adjustment that balances the torque provided by the cylinder in which the fuel is injected for an injector that is injecting more fuel than is desired. All vertical bars 302 represent a sweep of injected fuel amount and fuel injection timing to achieve balanced torque from the cylinder.

Vertical bars 302-306 exhibit the same patterns, except vertical bars 302 are shifted down the plot from vertical bars 304 by an amount 320. Likewise, vertical bars 306 are shifted up the plot from vertical bars 304 by an amount 322. Thus, when a fuel injector injects a greater amount of fuel than is desired, additional fuel has to be subtracted from the base fuel amount to balance the torque produced by the cylinder at the minimum fuel injection amount.

It can also be seen from FIG. 3 from bars 304 (e.g., properly operating injector), 302 (e.g., injector injecting extra fuel), and 306 (e.g., injector injecting less fuel) that for each injector, the minimum amount of fuel to bring the cylinder in balance is at −10 crankshaft degrees relative to base fuel injector timing. Thus, it can be seen that a change in the injected fuel amount can be detected by determining the minimum amount of fuel adjustment to the base fuel amount and then comparing the minimum amount of fuel adjustment to the minimum amount of fuel adjustment for other cylinders of the engine. Alternatively, the minimum amount of fuel adjustment for a cylinder may be compared to an expected minimum amount of fuel adjustment for the cylinder being balanced. The expected minimum amount of fuel adjustment may be stored in memory and may be based on operation of an injector operating in an expected manner (e.g., injecting a desired or expect amount of fuel). When comparing the minimum amount of fuel adjustment to balance torque of an engine cylinder with an expected minimum amount of fuel adjustment to balance torque of an engine cylinder, the minimum amount of fuel adjustment to balance torque of an engine cylinder can be subtracted from the expected minimum amount of fuel adjustment to balance torque of an engine cylinder to provide an injected fuel amount error. If the injected fuel error amount is outside of a predetermined range a condition of injected fuel amount degradation may be indicated. For example, if a predetermined range is ±2 mg/stroke of fuel adjustment to balance torque of a cylinder and it is found that 3 mg/stroke of fuel adjustment is required to balance torque of a cylinder, then a condition of injector degradation can be indicated. In this way, it is possible to determine whether or not a fuel injector is injecting an amount of fuel that is greater or less than an expected or desired amount of fuel.

It should be mentioned that in an alternate example, rather than finding and comparing a minimum amount of fuel adjustment to balance torque of an engine cylinder, a minimum amount of fuel injected to provide balanced torque from the cylinder may be used to determine if a fuel injection amount is out of range. Thus, the method of FIG. 5 may determine a minimum amount of fuel to balance torque of a cylinder in more than one way. It should also be mentioned that when bars 304 represent an expected minimum amount of fuel adjustment, distance 322 results when the absolute value of the amount of bars 304 are subtracted from bars 306. Likewise, distance 320 results when the absolute value of the amount of bars 304 are subtracted from bars 302.

Referring now to FIG. 4, a prophetic plot of cylinder torque balancing fuel amount adjustment with respect to fuel injection timing for three different fuel injection conditions is shown. The X and Y axis are the same as shown in FIG. 2. Therefore, the description of the X and Y axis is omitted for the sake of brevity.

Each narrow vertical bar 406 corresponds to an amount of fuel adjustment to a base fuel amount and a fuel injection timing adjustment that balances the torque provided by the cylinder in which the fuel is injected later than is desired. All vertical bars 406 represent a sweep of injected fuel amount and fuel injection timing to achieve balanced torque from the cylinder. Likewise, each dashed vertical bar 404 corresponds to an amount of fuel adjustment to the base fuel amount and a fuel injection timing adjustment that balances the torque provided by the cylinder in which the fuel is injected for an injector that is injecting fuel at a desired engine crankshaft position. All vertical bars 404 represent a sweep of injected fuel amount and fuel injection timing to achieve balanced torque from a cylinder. Similarly, each wide vertical bar 402 corresponds to an amount of fuel adjustment to the base fuel amount and a fuel injection timing adjustment that balances the torque provided by the cylinder in which the fuel is injected for an injector that is injecting fuel earlier than is desired. Thus, FIG. 4 shows maps of injectors that inject at different times when operated by a similar control signal.

Vertical bars 402-406 exhibit the same patterns, except vertical bars 406 are shifted left in the plot from vertical bars 404 by an amount 430. Likewise, vertical bars 402 are shifted left in the plot from vertical bars 404 by an amount 432. Thus, when a fuel injector injects fuel later in time than is desired, fuel injector timing has to be advanced in time to balance the torque produced by the cylinder.

It can be seen from FIG. 4 from bars 404 (e.g., properly operating injector), 402 (e.g., injector injecting earlier than desired), and 406 (e.g., injector injecting later than desired) that for each injector, the minimum amount of fuel to bring the cylinder in balance is at a different crankshaft angle timing relative to base fuel injector timing (e.g., bars 404). Thus, it can be seen that a change in the fuel injector timing can be detected by determining the crankshaft angle for the minimum amount of fuel adjustment to the base fuel amount, and then comparing the crankshaft angle where the minimum amount of fuel adjustment occurs to the crankshaft angle where the minimum amount of fuel adjustment for other cylinders of the engine occurs. Alternatively, the crankshaft angle where the minimum amount of fuel adjustment for a cylinder occurs may be compared to where an expected crankshaft angle where minimum amount of fuel adjustment for the cylinder occurs. The expected crankshaft angle where minimum amount of fuel adjustment occurs may be stored in memory and may be based on operation of an injector operating in an expected manner (e.g., injecting fuel at a desired or expect crankshaft angle). When comparing the crankshaft angle where the minimum amount of fuel adjustment to balance torque of an engine cylinder occurs with an expected crankshaft angle where the minimum amount of fuel adjustment to balance torque of an engine cylinder occurs, the crankshaft angle where the minimum amount of fuel adjustment to balance torque of an engine cylinder occurs can be subtracted from the expected crankshaft angle where the minimum amount of fuel adjustment to balance torque of an engine cylinder occurs to provide an injected fuel timing error (e.g., in units of crankshaft degrees). If the injected fuel timing error is outside of a predetermined range, a condition of injected fuel timing degradation may be indicated. For example, if a predetermined range is ±10 crankshaft degrees of fuel timing adjustment to balance torque of a cylinder and it is found that fuel timing has to be advanced by 20 crankshaft degrees to balance torque of a cylinder, then a condition of fuel injector timing degradation can be indicated. In this way, it is possible to determine whether or not a fuel injector is injecting fuel at a desired timing relative to engine crankshaft position.

It should be mentioned that in an alternate example, rather than finding and comparing a crankshaft angle where a minimum amount of fuel adjustment to balance torque of an engine cylinder, a crankshaft angle where a minimum amount of fuel injected to provide balanced torque from the cylinder may be used to determine if a fuel injection timing is out of range. Thus, the method of FIG. 5 may determine a crankshaft angle where a minimum amount of fuel to balance torque of a cylinder is in more than one way. It should also be mentioned that when bars 404 represent a base expected minimum amount of fuel adjustment, distance 430 results when an absolute value of the crankshaft distance between bars 406 and 404 is determined. Likewise, distance 432 results when the absolute value of the crankshaft distance between bars 402 and 404 is determined.

It should be noted that when both the difference in amount of fuel injected to balance torque of a cylinder and the difference in timing of fuel injected to balance torque of a cylinder are determined, errors in fuel injection timing and amount of fuel injected can be indicated or reported to an operator or a diagnostic tool. It should also be emphasized that the difference in the amount of fuel injected and the difference in timing of fuel injected is based on a minimum amount of fuel to balance torque of a cylinder.

The method of FIG. 5 is executable by controller 12 of FIG. 1. Controller 12 may include instructions to carry out the operations and calculations described in FIG. 5. Method 500 may be particularly useful during conditions of injector or injector driver degradation.

Referring now to FIG. 5, a flowchart of an example method for diagnosing fuel injector operation is shown. At 502, method 500 determines engine operating conditions. Engine operating conditions may include but are not limited to fuel injection pressure, engine speed, fuel injection timing, injected fuel amount, engine load, and engine temperature. Method 500 proceeds to 504 after engine operating conditions are determined.

At 504, method 500 judges whether or not conditions are present to diagnose fuel injectors. In one example, conditions for diagnosing fuel injectors are present when the engine is idling at a predetermined idle speed and load. In other examples, conditions for diagnosing fuel injectors are present when the engine is operating at a substantially constant engine speed and load, the engine speed and load higher than idle speed and load. Thus, it is possible to diagnose fuel injector operation over varying engine operating conditions.

At 506, method 500 determines base fuel injection timing and fuel amount for the present operating conditions. The base fuel injector timings can be extracted from empirically determined fuel injection timings that are stored in memory. The fuel injector timings may be related to engine performance, fuel economy, and emissions. In one example, the base fuel injection timing is expressed at a crankshaft angle where start of injection begins. In another example, the base fuel injection timing is expressed as a crankshaft angle where end of injection is scheduled. The fuel injection pulse with is determined based on a desired fuel injection amount and an injector transfer function that relates injector on time to injected fuel amount. In one example, the amount of fuel injected is determined from fuel calculations. For example, a driver torque demand from a pedal position sensor at a present engine speed is converted to an engine air and fuel amount. The air and fuel amounts may be empirically determined or calculated based on engine geometry and engine torque output. Method 500 proceeds to 508 after base fuel injection timing and base fuel amount are determined At 508, method 500 adjusts fuel injector timing and fuel injection amount to base timing and base fuel amount. In particular, method 500 adjusts fuel injection timing and fuel amount for each cylinder of the engine are set to base fuel injector timing and base fuel amount. Method 500 also begins cylinder torque balancing at 508. In one example, method 500 begins cylinder torque balancing by fixing fuel injection timing on a first group of cylinders and by adjusting fuel injection timing and fuel amount for a second group of cylinders. The second group of cylinders may be comprised of one or more cylinders. In one example, method 500 begins cylinder torque balancing by simultaneously balancing the torque produced by two engine cylinders. The cylinders may be selected so that they are separated by 360 crankshaft degrees in an engine firing order so that torque balancing of one cylinder does not interfere with torque balancing of another cylinder. In one example, torque of a cylinder is balanced by monitoring engine speed variations between cylinder combustion events and adjusting fuel amount and fuel timing based on engine speed. For example, if fuel is injected to a cylinder and the fuel is combusted, a fuel amount supplied to the cylinder can be increased to balance cylinder torque if the change in engine speed (e.g., acceleration) during a crankshaft angle interval where the combusted fuel is converted to engine torque is less than engine speed of other engine cylinders having base injection timing and base injection amount. In another example, an engine speed profile of a cylinder with a properly operating fuel injector may be stored in memory. If an amount of fuel injected to the cylinder produces an engine speed during a crankshaft angle interval where combusted fuel is converted to engine torque is less than the engine speed of the stored profile, an amount of fuel injected to the cylinder is increased. In this way, engine torque can be balanced by monitoring and comparing engine speed accelerations caused by combusting fuel in different engine cylinders. When a speed profile of the engine during a crankshaft interval where the fuel in the cylinder being balanced can produce torque matches the engine speed profile of the other cylinder or of the profile cylinder, the engine cylinder being balanced reaches a balanced condition. Method 500 proceeds to 510 after adjusting fuel injection timing, fuel amount, and beginning cylinder torque balancing.

At 510, method 500 stores fuel timing and fuel amount when torque of cylinder being balanced is balanced. As described above at 508, a torque of a cylinder may be determined to be balanced when the engine speed over a crankshaft interval where injected fuel in converted to engine torque substantially matches a stored engine speed profile or engine speed of other engine cylinders. If method 500 judges that torque of a particular cylinder being balanced is in balance, the fuel control parameters are stored to memory. For example, when it is determined that the torque of a cylinder is in balance, injected fuel amount, start of injection crankshaft angle, and end of injection crankshaft angle are stored to memory. Method 500 proceeds to 512 after fuel control parameters are stored to memory.

At 512, method 500 incrementally adjusts fuel injection amount while fuel injection start of injection timing is fixed. Alternatively, end of fuel injection timing may be fixed while fuel injection amount is adjusted. The injected fuel amount supplied to a cylinder during cylinder torque balancing may be increased during one cylinder cycle and decreased during a subsequent cylinder. Thus, the incremental fuel adjustment includes increasing and decreasing fuel amount. The amount of fuel that is added to or subtracted from the base fuel amount may be a predetermined amount of fuel or it may be a fractional amount of the cylinder fuel charge (e.g., the fuel injection amount may be adjusted by 5% of the total amount of fuel injected to the cylinder). As such, method 500 begins at a base amount of fuel injected and increases and decreases the base fuel amount so that fuel amounts where the cylinder's torque is in balance are stored at 510. In this way, the amount of fuel injected to a cylinder can be varied around the base fuel injection amount so that the minimum amount of fuel to balance torque of the cylinder can be located. Method 500 proceeds to 514 after fuel amount is incrementally changed.

At 514, method 500 judges whether or not a sweep of the injected fuel amount is complete. In one example, the sweep is complete when a predetermined amount of fuel has been added to and taken away from the base fuel amount. For example, during one engine cycle a maximum of 12 mg/stroke may be added to the base fuel amount for combustion. Similarly, 12 mg/stroke may be subtracted from the base fuel amount for combustion during a different engine cycle. Thus, a sweep in fuel amount about the base fuel amount may be accomplished. In another example, fuel injection amount may be incrementally increased from the base fuel amount until the engine speed signature during a crankshaft angle interval where injected fuel is converted to engine torque degrades or to some predetermined fuel injection limit is reached. Likewise, but during different engine cycles, fuel injection amount may be incrementally decreased from a base fuel amount until the engine speed signature during a crankshaft angle interval where the injected fuel is converted to engine torque degrades or to some predetermined fuel injection limit is reached. If method 500 judges that the sweep of fuel injection amount is complete, method 500 proceeds to 516. Otherwise, method 500 returns to 510.

At 516, method 500 incrementally adjusts fuel injection start of injection timing. Alternatively, method 500 incrementally adjusts fuel injection end of injection timing. In one example, method 500 advances injection timing when method proceeds to 516 during one pass through 516 and then retards injection timing during a subsequent pass through 516. Thus, method 500 can in alternative cycles advance and retard start of injection timing. After injection timing is advanced or retarded, method 500 proceeds to 518.

At 518, method 500 judges whether or not a sweep of the fuel injection timing is complete. In one example, the sweep is complete when a fuel injection timing start of injection is performed over a predetermined crankshaft angle range. For example, fuel injection start of injection timing can be varied between ±30 crankshaft angle degrees to perform a sweep of fuel injection timing. Thus, a sweep in fuel injection timing about the base fuel injection timing may be accomplished in this way. The sweep range may be a predetermined crankshaft angle or the sweep range may depend on whether or not engine speed changes. For example, if engine speed begins to decrease when fuel injection timing is advanced, the incremental advancing of fuel injection timing may be ceased. If method 500 judges that the sweep of fuel injection timing is complete, method 500 proceeds to 520. Otherwise, method 500 returns to 510.

In this way, fuel injection amount may be varied around (e.g., swept) a base fuel injection amount to determine a minimum fuel amount where cylinder torque balance is achieved. Further, fuel injection start of injection timing can be varied around a base start of injection time so that a map of minimum fuel injection amount for a range of start of injection timings is produced. For example, data such as is shown in FIG. 2 can be determined according to the method of FIG. 5.

At 520, method 500 compares the minimum fuel injection amounts and the injection timings where the minimum fuel injection amounts are present against predetermined injection amounts and injection timings. In one example, the comparison includes subtracting the values of data stored at 510 from data that represents known expected fuel injection amounts and fuel injection timings. Method 500 proceeds to 522 after comparing fuel injection amount data and fuel injection timing data.

At 522, method 500 judges whether or not the minimum fuel injection amount and the crankshaft angle at which the minimum fuel injection amount vary from predetermined ranges. For example, if start of fuel injection timing is at 160 crankshaft degrees before top-dead-center compression stroke and the desired start of injection timing is 175 crankshaft degrees before top-dead-center compression stroke, method 500 can indicate a condition of degraded fuel injector timing when only a range of ±10 crankshaft degrees of variation are desired from the 175 crankshaft degrees. Similarly, method 500 judges whether an amount of fuel injected is out of range. For example, if the adjusted injected fuel amount to balance torque of a cylinder is 8 mg/stroke and the desired injected fuel amount to balance torque of a cylinder is limited to +5 mg/stroke, method 500 can indicate a condition of degraded fuel injection amount. If method 500 judges a condition of degraded injector operation, method 500 proceeds to 524. Otherwise, method 500 proceeds to exit.

At 524, method 500 indicates conditions of degraded injector operation. In one example, degraded injector operation may be indicated to the vehicle operator or to a diagnostic tool. Method 500 proceeds to exit after indicating a condition of fuel injector degradation.

Thus, the method of FIG. 5 provides for a fuel injector diagnostic method, comprising: adjusting an amount of fuel injected to a cylinder to balance a torque produced via the cylinder with a torque produced via a different cylinder; sweeping cylinder fuel injection timing during the adjusting of the amount of fuel injected; and indicating a degradation of fuel injection when a minimum amount of fuel injected to the cylinder to balance the torque produced via the cylinder is outside a range. The fuel injector diagnostic includes where sweeping fuel injection timing comprises adjusting a start or end of fuel injection timing relative to a crankshaft position of an engine. The fuel injector diagnostic method includes where the degradation is a degradation of a start or end of fuel injection timing. The fuel injector diagnostic method includes where the degradation is a degradation of an amount of fuel injected to the cylinder. The fuel injector diagnostic method includes where the cylinder is one of a plurality of cylinders of an engine and where torque is balanced for each cylinder of the plurality of engine cylinders, and where the degradation is a degradation of an amount of fuel injected and a start or end of fuel injection timing. The fuel injector diagnostic method includes where the amount of fuel injected to the cylinder is adjusted during combustion cycles where the start or end of fuel injection timing is held substantially constant, and where the start or end of fuel injection timing is adjusted during combustion cycles where the amount of fuel injected to the cylinder is held substantially constant. The fuel injector diagnostic method includes where at least two of the plurality of cylinders of the engine are balanced during a cycle of the engine.

The method of FIG. 5 also provides for a method for diagnosing operation of a fuel injector, comprising: injecting fuel to a cylinder of an engine at a initial start of fuel injection timing or an end of fuel injection timing; incrementally performing a sweeping of fuel injection timing of the cylinder, the sweeping of fuel injection timing from the initial start of fuel injection timing or the end of fuel injection timing, the sweeping of fuel injection timing comprised of a plurality of start of fuel injection timings or a plurality of end of fuel injection timings; incrementally performing a sweeping of an amount of fuel injected to the cylinder, the sweeping of the amount of fuel injected to the cylinder comprised of a plurality of injected fuel amounts for each of the plurality of start of fuel injection timings or a plurality of injected fuel amounts for each of the plurality of end of fuel injection timings; and indicating degradation of fuel injection when a minimum amount of fuel injected to balance a torque of the cylinder is outside a range. The method includes where the torque of the cylinder is balanced with respect to a torque produced by a different cylinder of the engine. The method includes where the torque of the cylinder is balanced with respect to an expected torque of the cylinder. The method includes where the sweeping of fuel injection timing of the cylinder is performed at idle speed, and further comprising adjusting fuel injection timing at engine speeds other than idle speed in response to the sweeping of fuel injection timing of the cylinder. The method includes where the sweeping of an amount of fuel injected to the cylinder includes increasing and decreasing the amount of fuel injected to the cylinder. The method includes where a sweeping of fuel injection timing of the cylinder includes advancing and retarding a crankshaft angle where starting or ending an injection of fuel occurs. The method includes where the indication of degradation of fuel injection is an indication of degradation of a start or end of fuel injection timing. The method includes where the indication of degradation of fuel injection is an indication of degradation of an amount of fuel injected to the cylinder. The method includes where the indication of degradation of start or end of fuel injection timing is in response to the minimum amount of fuel injected to balance torque of the cylinder outside a range of crankshaft angles.

As will be appreciated by one of ordinary skill in the art, the method described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps, methods, or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:
1. A fuel injector method, comprising:
adjusting an amount of fuel injected to a cylinder to balance a torque produced via the cylinder with a torque produced via a different cylinder;

sweeping cylinder fuel injection timing during the adjusting of the amount of fuel injected; and indicating a degradation of fuel injection and adjusting operation when a minimum fuel injection amount to balance the torque produced via the cylinder is outside a range.

2. The fuel injector diagnostic method of claim 1, where sweeping fuel injection timing comprises adjusting a start or end of fuel injection timing relative to a crankshaft position of an engine.

3. The fuel injector diagnostic method of claim 1, where the degradation is a degradation of a start or end of fuel injection timing.

4. The fuel injector diagnostic method of claim 1, where the degradation is a degradation of an amount of fuel injected to the cylinder.

5. The fuel injector diagnostic method of claim 1, where the cylinder is one of a plurality of cylinders of an engine and where torque is balanced for each cylinder of the plurality of engine cylinders, and where the degradation is a degradation of an amount of fuel injected and a start or end of fuel injection timing.

6. The fuel injector diagnostic method of claim 2, where the amount of fuel injected to the cylinder is adjusted during combustion cycles where the start or end of fuel injection timing is held substantially constant, and where the start or end of fuel injection timing is adjusted during combustion cycles where the amount of fuel injected to the cylinder is held substantially constant.

7. The fuel injector diagnostic method of claim 5, where at least two of the plurality of cylinders of the engine are balanced during a cycle of the engine.

8. A method for diagnosing operation of a fuel injector, comprising:

injecting fuel to a cylinder of an engine at an initial start of fuel injection timing or an end of fuel injection timing;

incrementally performing a sweeping of fuel injection timing of the cylinder, the sweeping of fuel injection timing from the initial start of fuel injection timing or the end of fuel injection timing, the sweeping of fuel injection timing comprised of a plurality of start of fuel injection timings or a plurality of end of fuel injection timings;

incrementally performing a sweeping of an amount of fuel injected to the cylinder, the sweeping of the amount of fuel injected to the cylinder comprised of a plurality of injected fuel amounts for each of the plurality of start of fuel injection timings or a plurality of injected fuel amounts for each of the plurality of end of fuel injection timings; and indicating degradation of fuel injection when a minimum amount of fuel injected to balance a torque of the cylinder is outside a range.

9. The method of claim 8, where the torque of the cylinder is balanced with respect to a torque produced by a different cylinder of the engine.

10. The method of claim 8, where the torque of the cylinder is balanced with respect to an expected torque of the cylinder.

11. The method of claim 8, where the sweeping of fuel injection timing of the cylinder is performed at idle speed, and further comprising adjusting fuel injection timing at engine speeds other than idle speed in response to the sweeping of fuel injection timing of the cylinder.

12. The method of claim 8, where the sweeping of an amount of fuel injected to the cylinder includes increasing and decreasing the amount of fuel injected to the cylinder.

13. The method of claim 8, where a sweeping of fuel injection timing of the cylinder includes advancing and retarding a crankshaft angle where starting or ending an injection of fuel occurs.

14. The method of claim 8, where the indication of degradation of fuel injection is an indication of degradation of a start or end of fuel injection timing.

15. The method of claim 8, where the indication of degradation of fuel injection is an indication of degradation of an amount of fuel injected to the cylinder.

16. The method of claim 14, where the indication of degradation of start or end of fuel injection timing is in response to the minimum amount of fuel injected to balance torque of the cylinder outside a range of crankshaft angles.

17. A system for diagnosing operation of a fuel injector, comprising:

an engine;

a fuel injector in fluid communication with a cylinder of the engine; and a controller, the controller including instructions for adjusting an amount of fuel injected to a cylinder to balance a torque produced via the cylinder, the controller including further instructions to sweep fuel injection timing of the cylinder during the adjusting of the fuel injection amount, the controller including further instructions for indicating conditions of degradation of start or end of fuel injection timing and for indicating conditions of degradation of an amount of fuel injected to the cylinder in response to a minimum amount of fuel injected to the cylinder to balance the torque produced via the cylinder being outside a range.

18. The system of claim 17, where the fuel injector is a direct injector, and where the engine is a diesel engine.

19. The system of claim 17, where the controller includes further instructions to balance a torque produced by each cylinder of a plurality of cylinders of the engine.

20. The system of claim 17, where the controller includes instructions for adjusting fuel injection amount or start of fuel injection timing beyond limits of fuel injection amount and start of fuel injection timing when the torque of the cylinder is not experiencing torque balancing.

\* \* \* \* \*